(12) United States Patent
Hall et al.

(10) Patent No.: US 10,636,225 B2
(45) Date of Patent: Apr. 28, 2020

(54) METHOD AND SYSTEM FOR LOAD MANAGEMENT IN MACHINES

(71) Applicant: Caterpillar Inc., Peoria, IL (US)

(72) Inventors: James C. Hall, Peoria, IL (US); Stephen Thompson, Sunderland (GB); Jonathan Peter Moses, Durham (GB); Samuel Alec Roberts, Stamford (GB)

(73) Assignee: Caterpillar Inc., Peoria, IL (US)

(*) Notice: Subject to any disclaimer, the term of this patent is extended or adjusted under 35 U.S.C. 154(b) by 313 days.

(21) Appl. No.: 15/864,526

(22) Filed: Jan. 8, 2018

(65) Prior Publication Data

US 2019/0213806 A1 Jul. 11, 2019

(51) Int. Cl.
| | |
|---|---|
| *G07C 5/02* | (2006.01) |
| *B60P 1/04* | (2006.01) |
| *G06Q 10/06* | (2012.01) |
| *G01G 19/62* | (2006.01) |
| *G01P 3/00* | (2006.01) |
| *G01G 19/12* | (2006.01) |

(52) U.S. Cl.
CPC ............ *G07C 5/02* (2013.01); *B60P 1/04* (2013.01); *G01G 19/12* (2013.01); *G01G 19/62* (2013.01); *G01P 3/00* (2013.01); *G06Q 10/06398* (2013.01)

(58) Field of Classification Search
None
See application file for complete search history.

(56) References Cited

U.S. PATENT DOCUMENTS

| | | | | |
|---|---|---|---|---|
| 1,739,072 A | * | 12/1929 | Howard | B65B 1/32 177/57 |
| 2,889,130 A | * | 6/1959 | Crabb | B65B 1/32 177/72 |
| 3,276,525 A | * | 10/1966 | Cass | G01G 3/147 177/1 |
| 3,782,487 A | * | 1/1974 | Leen | G01G 23/36 177/245 |
| 4,793,429 A | * | 12/1988 | Bratton | G01G 3/13 177/1 |
| 5,610,372 A | * | 3/1997 | Phillips | G01G 19/086 177/1 |

(Continued)

FOREIGN PATENT DOCUMENTS

| | | |
|---|---|---|
| EP | 2306163 | 4/2011 |
| JP | 08271326 A * | 10/1996 |
| WO | 2015000665 | 1/2015 |

*Primary Examiner* — Shelley Chen
(74) *Attorney, Agent, or Firm* — Obhan & Associates

(57) ABSTRACT

A method for operating a machine adapted to transport a load during a work cycle is disclosed. The method includes determining a first stationary state of the machine, and causing sensors to start transmission of first signals. The first stationary state corresponds to a first segment of the work cycle, and the first signals indicate a weight of the load during the first segment. Further, the method includes determining a moving state of the machine corresponding to a second segment of the work cycle, and causing the sensors to terminate transmission of the first signals. Furthermore, the method includes determining a second stationary state of the machine, and causing the sensors to start transmission of second signals. The second stationary state corresponds to a third segment of the work cycle, and the second signals indicate a weight of the load during the third segment.

20 Claims, 6 Drawing Sheets

(56) References Cited

U.S. PATENT DOCUMENTS

| | | | |
|---|---|---|---|
| 5,822,224 A | 10/1998 | Nakanishi et al. | |
| 9,605,994 B2 | 3/2017 | Jensen | |
| 2007/0181350 A1 | 8/2007 | Kranz et al. | |
| 2014/0039767 A1* | 2/2014 | Jensen | B60K 23/0808 |
| | | | 701/50 |
| 2014/0039772 A1* | 2/2014 | Jensen | B60K 23/0808 |
| | | | 701/69 |

* cited by examiner

METHOD AND SYSTEM FOR LOAD MANAGEMENT IN MACHINES

TECHNICAL FIELD

The present disclosure relates to methods and systems of managing loads in machines. More particularly, the present disclosure relates to transmission of signals relating to a weight of a load carried by a machine during different segments of a work cycle of the machine.

BACKGROUND

Machines, such as articulated trucks or dump trucks, are typically used to transport loads from a load location to a dump location, during a work cycle. A weight of such transported loads may be measured. Measuring such loads have traditionally been performed with wired sensors. As wireless communication protocols have become more robust, wireless sensors have increasingly been used for wireless transmission of data. Wireless sensors have the advantage of eliminating costs associated with the installation of related wirings. Wireless sensors also improve reliability by eliminating connector problems and complexities involved in routing and in the maintenance of the wirings typically used for wired sensors. However, wireless sensors require a continuous supply of power, by a power source, in order for the wireless sensors to perform the different sensor functions. The power source may include one or more batteries packaged together with the sensor. The continuous transmission of wireless signals drains the power source, shortens the life of the power source, and necessitates frequent charging and/or replacement of the power source, which may lead to machine downtime, increased cost, and considerable maintenance efforts.

European Patent Application No. 2,306,163 ('163 reference) relates to a method and a system for improving the accuracy of a measurement device of a material transporting means. The '163 reference includes a weighing of a transported material with a first weighing means while loading, and with a second weighing means while unloading. A weighing result of the first weighing means and the weighing result of the second weighing means are compared with each other. If the deviation between the results of first and second weighing means exceeds a predetermined limit value, one of the weighing means is adjusted according to the other weighing means.

SUMMARY OF THE INVENTION

In one aspect, the disclosure is directed towards a method for operating a machine adapted to transport a load during a work cycle. The method includes determining a first stationary state of the machine, and causing one or more sensors to start transmission of one or more first signals based on determining that the machine is in the first stationary state. The first stationary state corresponds to a first segment of the work cycle, and the one or more first signals indicate a weight of the load during the first segment. Further, the method includes determining a moving state of the machine, and causing the one or more sensors to terminate the transmission of the one or more first signals based on determining that the machine is the moving state. The moving state corresponds to a second segment of the work cycle. Furthermore, the method includes determining a second stationary state of the machine, and causing the one or more sensors to start transmission of one or more second signals based on determining that the machine is in the second stationary state. The second stationary state corresponds to a third segment of the work cycle, and the one or more second signals indicate a weight of the load during the third segment.

In another aspect, the disclosure relates to a load management system for a machine. The load management system includes one or more sensors and a controller. The sensors are configured to detect a weight of a load received into the machine, while the controller is communicably coupled with the one or more sensors. The controller is configured to determine a first stationary state of the machine, and cause one or more sensors to start transmission of one or more first signals based on determining that the machine is in the first stationary state. The first stationary state corresponds to a first segment of the work cycle, and the one or more first signals indicate a weight of the load during the first segment. Further, the controller is configured to determine a moving state of the machine, and cause the one or more sensors to terminate the transmission of the one or more first signals based on determining that the machine is the moving state. The moving state corresponds to a second segment of the work cycle. Furthermore, the controller is configured to determine a second stationary state of the machine, and cause the one or more sensors to start transmission of one or more second signals based on determining that the machine is in the second stationary state. The second stationary state corresponds to a third segment of the work cycle, and the one or more second signals indicate a weight of the load during the third segment.

In yet another aspect, the disclosure is directed to a machine. The machine includes a dump body configured to receive a load, and a beam to support the dump body and bear a weight of the load received into the dump body. Further, the machine includes one or more sensors coupled to the beam and configured to detect the weight of the load, and a controller that is communicably coupled to the sensors. The controller is configured to determine a first stationary state of the machine, and cause one or more sensors to start transmission of one or more first signals based on determining that the machine is in the first stationary state. The first stationary state corresponds to a first segment of the work cycle, and the one or more first signals indicate a weight of the load during the first segment. Further, the controller is configured to determine a moving state of the machine, and cause the one or more sensors to terminate the transmission of the one or more first signals based on determining that the machine is the moving state. The moving state corresponds to a second segment of the work cycle. Furthermore, the controller is configured to determine a second stationary state of the machine, and cause the one or more sensors to start transmission of one or more second signals based on determining that the machine is in the second stationary state. The second stationary state corresponds to a third segment of the work cycle, and the one or more second signals indicate a weight of the load during the third segment.

DETAILED DESCRIPTION

Figure 1:
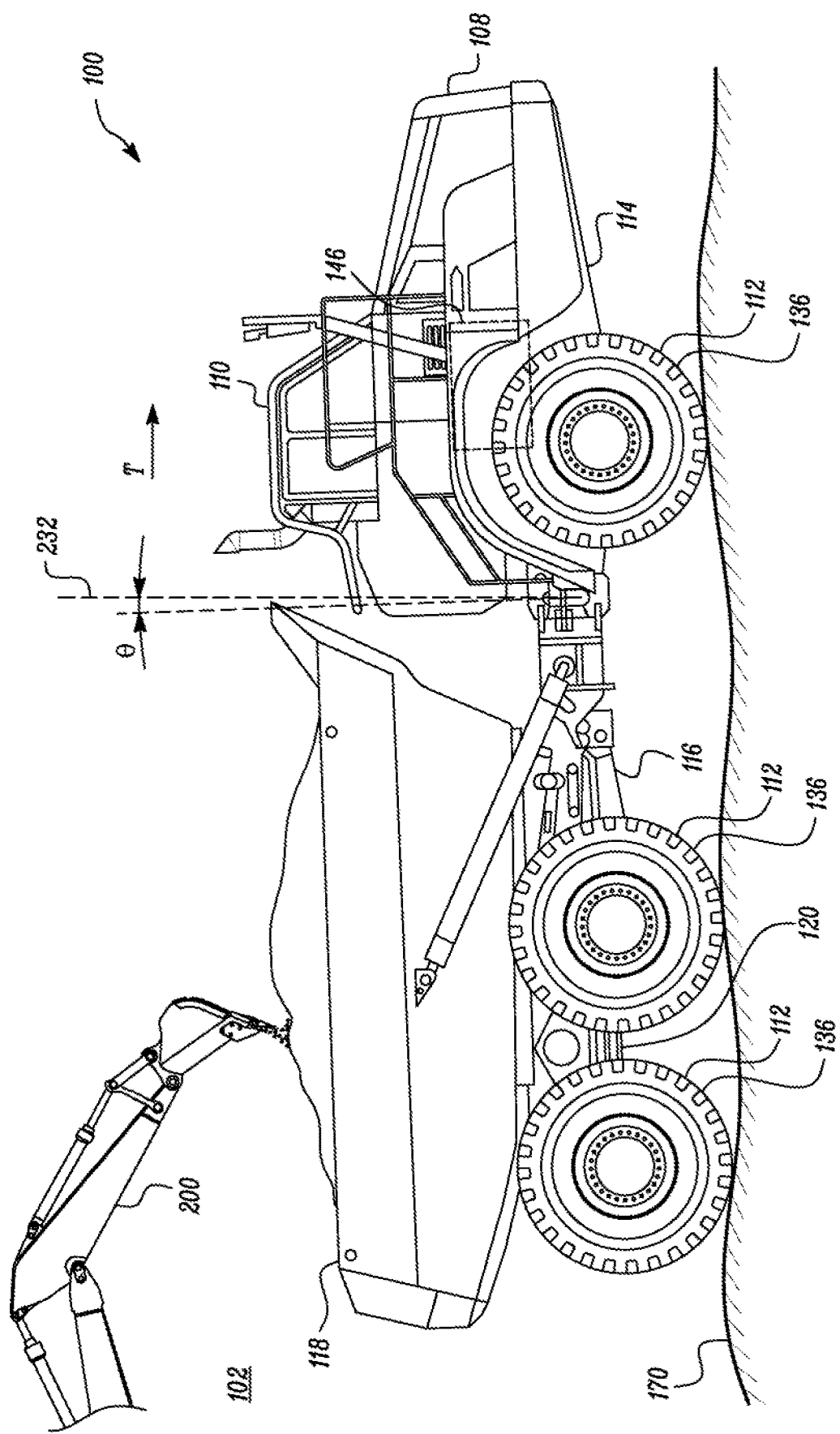
FIG. 1 is a side elevation of a machine at a worksite, illustrating a receipt of a load into the machine, in accordance with an embodiment of the disclosure.

Referring to FIG. 1, there is shown a machine 100 operating at a worksite 102. The worksite 102 may be a construction site, a mine site, a landfill, and/or a quarry, to which one or more aspects of the present disclosure are applicable. The machine 100 may be an articulated truck, as shown. However, the depiction of the machine 100 as an articulated truck is exemplary, and, thus, aspects of the present disclosure may be applicable to a variety of other machines, such as a dozer, an excavator, or any other such mining machines, off-highway trucks, forest machines, agricultural machines, pick-up trucks, scraper machines, construction machines, general transportation machines, etc. The machine 100 includes a power compartment 108, an operator cab 110, traction devices 112, a front frame 114, a rear frame 116, a payload carrier or a dump body 118, and a beam 120 to support the rear frame 116 on the traction devices 112. The machine 100 also includes a load management system 130 (see FIGS. 2 and 4), aspects of which will be discussed later in the application. The terms 'front' and 'rear' are used herein, and are relative to an orientation of the machine 100 as illustrated in FIG. 1, and/or are in relation to a direction of travel of the machine 100, as represented by arrow. T, in FIG. 1.

Figure 4:
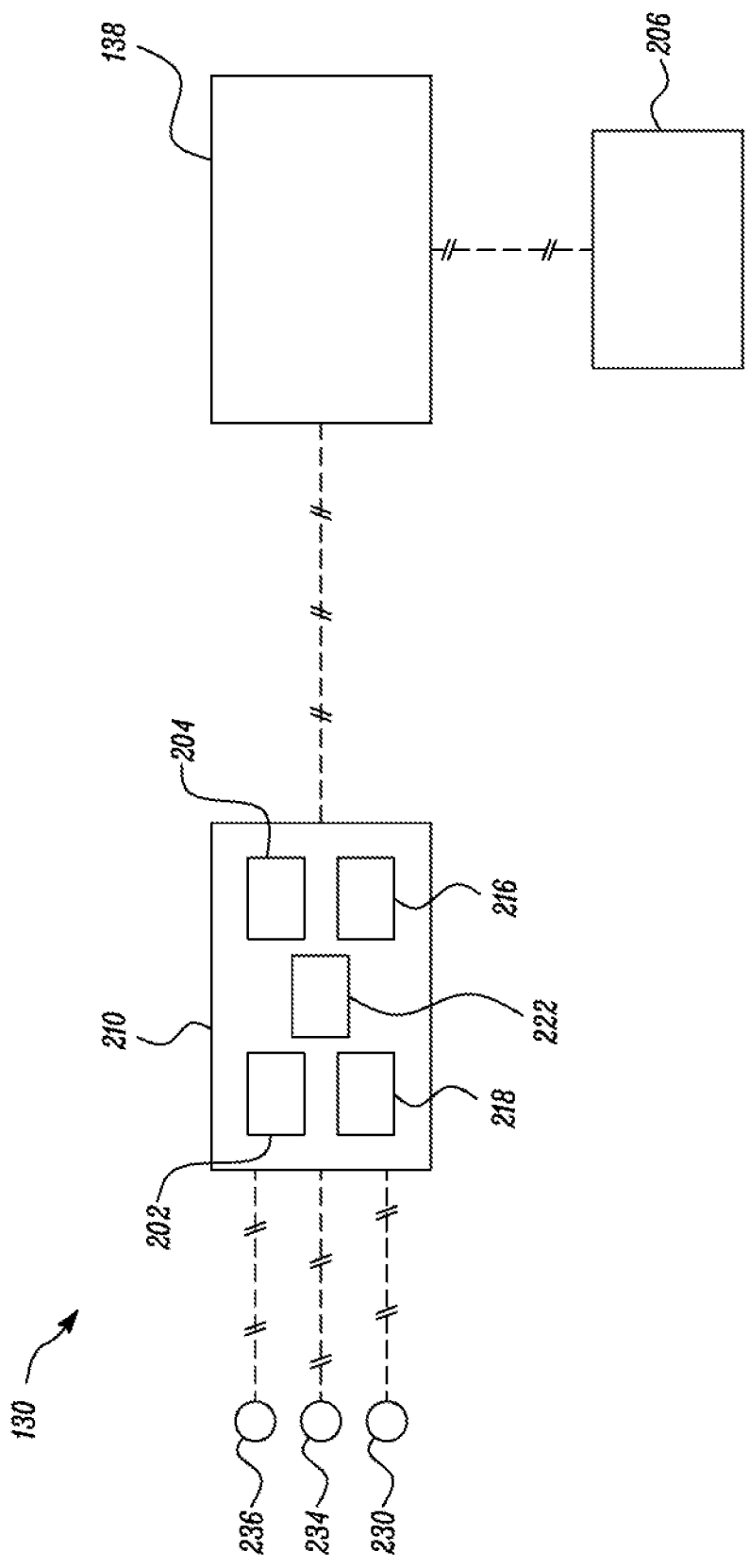
FIG. 4 is a schematic view of a load management system of the machine, in accordance with an embodiment of the disclosure.

Further, the machine 100 includes a controller 138 (see FIG. 4). The controller 138 may be a main controller of the machine 100 or may belong to an electronic control module (ECM) of the machine 100, or to any other control module of the machine 100. In some embodiments, however, the controller 138 may be a stand-alone entity. Further, the controller 138 may be communicably coupled to the load management system 130, and may be configured to deduce a weight of the load carried by the machine 100 (e.g., by the dump body 118) during a work cycle of the machine 100.

The power compartment 108 may include a power source that may be used to power a variety of functions of the machine 100. In an example, the power source may be an internal combustion engine that may be driven by use of any conventional fuel. The power source may be applied to provide motive power to the traction devices 112 to move the machine 100 from one location to another. The traction devices 112, in this implementation, may represent and/or include a front wheel 132, a center wheel 134, and a rear wheel 136, as shown. Similar wheels (not shown) may be arranged on the other side of the machine 100, as well. The front wheel 132 may be coupled to the front frame 114, while the center wheel 134 and the rear wheel 136 may be coupled to the rear frame 116. Further, a controlling of the power source, alongside a variety of other functions of the machine 100, may be performed by using one or more input devices provided within the operator cab 110. Furthermore, the machine 100 may also include a transmission assembly 146 that translates the power generated by the power source to the traction devices 112.

Figure 2:
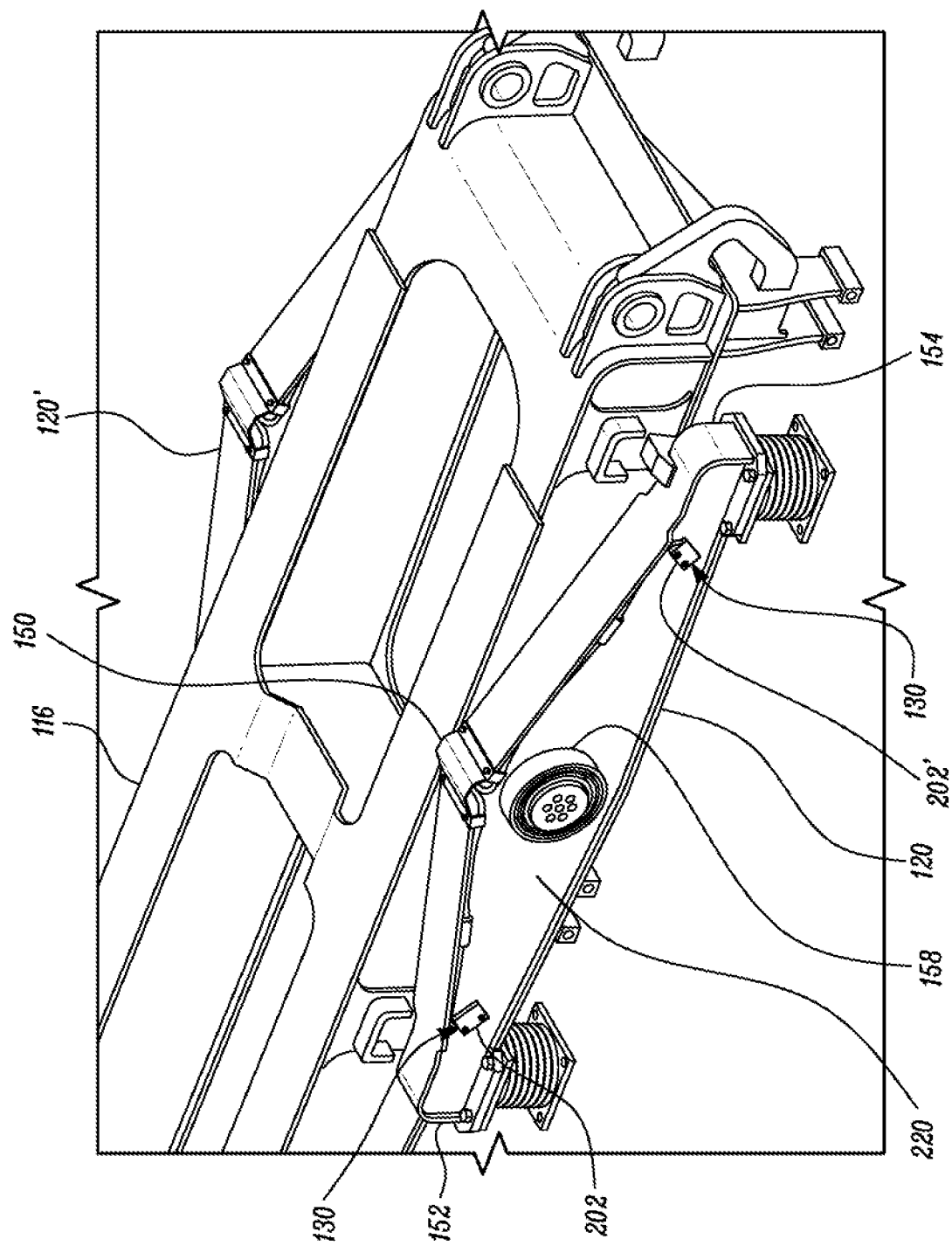
FIG. 2 is an arrangement of a rear frame and a beam of the machine, in accordance with an embodiment of the disclosure.

Referring to FIGS. 1 and 2, the beam 120 is adapted to support the dump body 118 and bear a weight of the load in the dump body 118. The beam 120 may be formed as a substantially triangular shaped structure having an apex 150, a front end 152, and a rear end 154. The beam 120 may be pivotally connected to the rear frame 116 through a hitch or a hinge 158 provided close to the apex 150 of the beam 120. The center wheel 134 and the rear wheel 136 may be coupled to the rear frame 116 through the beam 120. In some embodiments, the center wheel 134 may be coupled to the beam 120 at the front end 152, while the rear wheel 136 may be coupled to the beam 120 at the rear end 154. A similar beam 120' (see FIG. 2) may be present on the other side of the machine 100 to couple wheels (not shown) present on the other side of the machine 100 to the rear frame 116. The beam 120 may be made of any suitable metal using any known manufacturing process like casting, forging, and so on. Further, a shape, size, dimensions and a material of the beam 120 may change according to machine design and other requirements. Accordingly, a shape and profile of the beam 120, as disclosed, is purely exemplary.

The dump body 118 may be supported on the rear frame 116 of the machine 100, as shown. The dump body 118 may receive a load, while the machine 100 may carry the dump body 118, facilitating transport of said load from one location to another. The dump body 118 may include a recess into which a load may be received. According to one aspect, the dump body 118 may be raised or lowered relative to the rear frame 116 of the machine 100, so as to dump the load at a dump location. In one scenario, a raising and lowering of the dump body 118 may be powered by the power source. According to another aspect, the machine may be an ejector machine having a dump body and an ejector blade disposed inside the dump body. The ejector blade may be moved to push the material out of the dump body.

Figure 3:
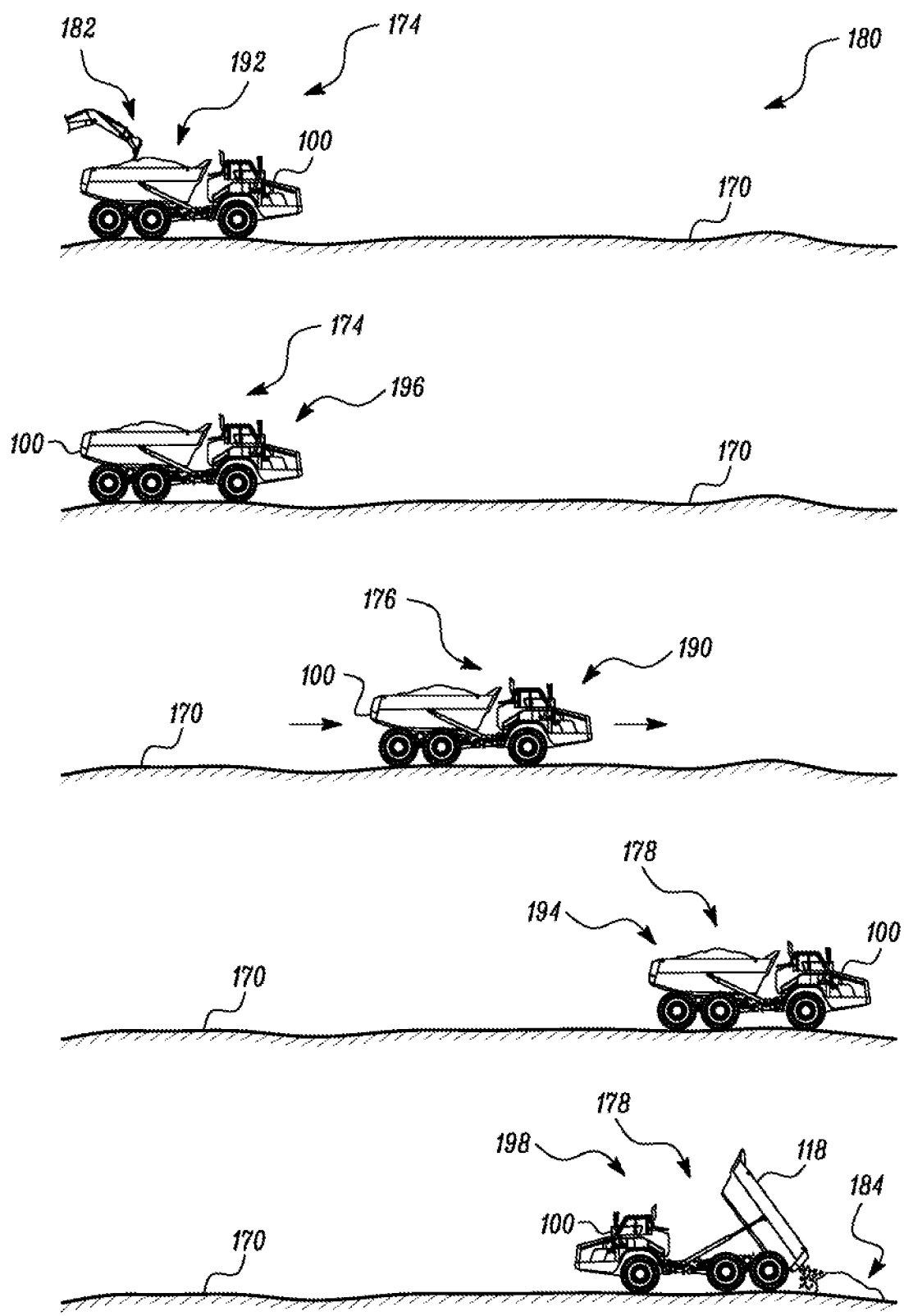
FIG. 3 is a series of views depicting an operation of the machine during an exemplary work cycle of the machine, in accordance with an embodiment of the disclosure.

Referring to FIG. 3, an exemplary depiction of a work cycle 180 of the machine 100 is provided. In some embodiments, the machine 100 may execute multiple work cycles during a work shift to a transport a load from a load location 182 to a dump location 184 (see FIG. 3). In some embodiments, the work cycle 180 may be divided into multiple segments. For example, the work cycle 180 may include a first segment 174, a second segment 176, and a third segment 178. The first segment 174 may be a loading segment corresponding to the receipt of the load into the machine 100 at the load location 182 indicating a start of the work cycle 180. The second segment 176 may be a hauling segment corresponding to a hauling of the load from the load location 182 to the dump location 184. The third segment 178 may be a dumping segment corresponding to a dumping of the load at the dump location 184, indicating an end of the work cycle 180.

The machine 100 may be in a first stationary state 192 during the first segment 174, while the machine 100 may be in a second stationary state 194 during the third segment 178. The stationary states 192, 194 may refer to a condition when the machine 100 is stationary or substantially stationary (relative to the underlying ground surface 170). For example, the machine 100 may be stationary relative to the underlying ground surface 170 before dumping the load, when the load is being received into the machine 100 (or into the dump body 118), or when the machine 100 is stationary after a receipt of the load is complete. For example, in the first stationary state 192, the machine 100 may receive a load from the load location 182, indicating a start of the work cycle 180, and in the second stationary state 194, the machine 100 may be at the dump location 184 and may be stationary prior to dumping the load at the dump location 184.

Although not limited, the work cycle 180 may include a third stationary state 196 of the machine 100. The third stationary state 196 may be defined as when the machine 100 is loaded and remains motionless relative to the underlying ground surface 170 after the receipt of load and before a motion is executed by the machine 100. Moreover, a fourth stationary state 198 may be defined when the machine 100 is in the process of unloading/dumping the load at the dump location 184, such as by raising the dump body 118. Here, dumping the load at the dump location 184 may mean an end of the work cycle 180 of the machine 100. Nevertheless, it may be understood that the machine 100 may return to the load location 182 to receive next batch of load, indicating start of another work cycle of the machine 100.

In some embodiments, the work cycle 180 may include multiple stationary states of the machine 100. For example, the machine 100 may be loaded and at the same time wait at an intersection or a road junction at the worksite 102, or possibly, the machine 100 may be loaded and stationed temporarily for a change of operator. Further, it may be noted that in some cases a stationary state of the machine 100 may correspond to a state when a speed of the machine 100 is below a speed threshold. In so doing, machines, such as wheel tractor scrapers (that may receive load concomitant to a machine movement), may make use of such a feature, and may register an influx of load even during machine movement. Effectively, therefore, in some embodiments, a determination of any stationary state of the machine 100 may be ascertained when a speed of the machine 100 is below a speed threshold.

It may be noted that the references 'first stationary state', 'second stationary state', 'third stationary state', and 'fourth stationary state', are merely references to distinguish different stationary states of the machine 100 during the work cycle 180. Said references, therefore, need not be seen as being in a chronological order according to the common usage of terms 'first', 'second', 'third', and 'fourth'.

In some embodiments, the machine 100 may be in a moving state 190 when traveling from the load location 182 to the dump location 184. In the moving state 190 (i.e., during the second segment 176 of the work cycle 180), the machine 100 may be moving at a speed above the speed threshold.

The term 'load location 182' may refer to a location at the worksite 102 at which the machine 100 may receive an amount of a load. For example, the load may be transported into the dump body 118 by use of machines such as an excavator 200 (see FIG. 1), or loaders, and/or the like. The term 'dump location 184', on the other hand, may refer to a location at the worksite 102 where the machine 100 may unload or dump the load.

Referring to FIGS. 2 and 4, the load management system 130 is discussed. The load management system 130 is configured to estimate a weight of the load transported by the machine 100, during the work cycle 180. The load management system 130 includes a sensor 202 and a controller 204.

The sensor 202 may be an autonomous sensing unit powered by a power source (e.g., a battery 222) (see FIG. 4). The sensor 202 may be configured to detect and/or measure strain or pressure. For example, the sensor 202 may be configured to detect a weight of the load within the dump body 118 of the machine 100 and/or configured to obtain information that may be used to detect the weight of the load. According to an aspect of the present disclosure, the sensor 202 may transmit an output (or sensor data) whenever the machine 100 is stationary, so as to improve an accuracy of a measured load. In some embodiments, the sensor 202 and the controller 204 may define a sensor node 210. The sensor node 210 may also include a memory 216 and a transceiver 218.

The sensor 202 may be mounted to the beam 120, and may be positioned at the front end 152 of the beam 120. In some embodiments, the sensor 202 may be positioned closer to the front end 152 than to the rear end 154 of the beam 120. As shown, the sensor 202 may be positioned on a side face or a side wall 220 of the beam 120. It may be noted that the sensor 202 may be located in a region (i.e., at the front end 152 as depicted) of the beam 120, at which a weight of the load loaded within the dump body 118 may be experienced. In some embodiments, the sensor 202 may be a wireless sensor, and may include one of a wireless strain sensor, a wireless pressure sensor, and/or other types of weight sensors that are capable of transmitting data wirelessly. In some embodiments, the sensor 202 may include a foil or a wire type strain sensor, a film type strain sensor, a semiconductor strain sensor, a bonded resistance strain sensor, a capacitive strain sensor, a hydraulic load cell, a pneumatic load cell, a strain gauge load cell, or any other sensor to detect and/or measure strain or pressure (and/or detect and/or measure weight).

Although a single sensor 202 is discussed in the present disclosure, the load management system 130 may include a number of sensors. For example, an additional sensor 202', similar in form and function to the sensor 202, may be mounted symmetrically opposed to the beam 120, at (or near to) the rear end 154 of the beam 120. A placement of the sensor 202 (or the additional sensor 202') to other locations on the beam 120 or machine 100 is possible, and such locations may be contemplated. In addition to the sensors 202, 202', there may be two more sensors provided on the beam 120. For example, the beam 120 may include a side wall (not shown) opposed to the side wall 220, and the two additional sensors may be positioned on such a sidewall (similarly as the sensors 202, 202'). In some embodiments, therefore, the beam 120 may include four sensors. Further, it may be understood that the beam 120' may also include similarly positioned four sensors (not shown). A different number of sensors may however be contemplated. In some embodiments, the sensor 202 may be a wireless pressure sensor measuring a suspension strut pressure.

The sensor 202 may be wirelessly coupled to the controller 138 of the machine 100. The sensor 202 may interact with the controller 204, and may deliver signals (e.g., data relating to strain, pressure, weight and/or the like) to the controller 138. In this regard, the signals provided by the sensor 202 may pertain to the weight of the load and may be processed and analyzed by the controller 138 to determine, for example, a productivity of a work shift in which the machine 100 operates. For example, the machine 100 may work for multiple work cycles in a work shift, and a weight of the load transported during each work cycle may be summated to determine a total amount of (or weight of) load transported during the work shift.

The memory 216 may be communicably coupled to the sensor 202 and may receive and store signals from the sensor 202 indicating the weight of the load, during operations. In some embodiments, it is possible for the memory 216 to include one or more of a Solid-state drive (SSD), a hard drive (HD) drive, a portable disk, USB (Universal Serial Bus) drive, memory stick, flash drives, or similar such devices in a known and applicable configuration. In some embodiments, the memory 216 may be also configured to store a set of computer readable instructions, and various charts and/or models that may be accessed by the controller 138. Further, the memory 216 may also include, but are not limited to, a random access memory (RAM) and a read only memory (ROM).

The controller 204 of the load management system 130 may be communicably coupled to the sensor 202, and may be capable of processing information gathered by the sensor 202. For example, the controller 204 may gather and process data corresponding to the detected load, and may facilitate distribution of processed data to one or more locations, such as to the controller 138, wirelessly. In some embodiments, the controller 204 may manage and prepare a digital data stream, corresponding to the strain or pressure (indicating the weight of the load) or weight of the load, for wireless transmission of the digital data stream by the transceiver 218 to any system/sub-system of the machine 100. A management and preparation of the data stream provided by the controller 204 may include data processing, data reduction, data filtering, and providing error correction codes, and the like, before said wireless transmission may occur. In some embodiments, data provided by controller 204 may include a real time digital data stream—e.g., a live feed during an actual operation of the machine 100 at the worksite 102.

Signals from the sensor 202, indicative of the weight of the load (or the strain and/or pressure indicating the weight of the load), may be transmitted to the controller 138 during a stationary state (e.g., the first stationary state 192, the second stationary state 194, the third stationary state 196, and/or the fourth stationary state 198). In some embodiments, however, during the fourth stationary state 198, and particularly, from a start of dumping the load, the sensor 202 may detect a progressively decreasing weight of the load in the dump body 118. As soon as the sensor 202 detects the decreasing load and transmits sensor output or sensor data (corresponding to the decreasing load) to the controller 204, the controller 204 may terminate transmission of signals from the sensor 202 to the controller 138. This is because signal transmission during the fourth stationary state 198 of the work cycle 180 (i.e., during dumping operation) may be unrequired in certain situations, and may unnecessarily drain the battery 222. Alternatively, it is possible that the controller 204 may detect a raising of the dump body 118 as an indicator of the dumping operation of the machine 100 or of the fourth stationary state 198 of the machine 100 for the work cycle 180, and may accordingly terminate transmission of signals, received from the sensor 202, to the controller 138.

The transceiver 218 may enable communication between the controller 204, the memory 216, and the sensor 202, and, in some cases, between the sensor node 210 and the controller 138. Such communication may be made possible by using one or more communication protocols, such as, I2C®, Zigbee®, Infrared, and Bluetooth®. Additionally, the transceiver 218 may be further configured to transmit and receive messages and data to/from various devices, such as from the controller 204/memory 216 to the controller 138. According to one aspect of the present disclosure, the transceiver 218 communicates with the controller 138 wirelessly.

According to an aspect of the present disclosure, to determine whether the machine 100 is in a stationary state or a moving state, the controller 204 may be coupled to a variety of sensors of the machine 100. In one example, the machine 100 includes a transmission speed sensor 234 that is associated with the transmission assembly 146 of the machine 100. The transmission speed sensor 234 may be configured to detect a drive/operation of the transmission assembly 146 by sensing angular velocity of a transmission output shaft (not shown) and generating corresponding signals that indicate a motion of the transmission output shaft and, thus, the motion of the machine 100. The controller 204 may be communicably coupled to the transmission speed sensor 234 and may receive signals from the transmission speed sensor 234, analyze said signals, and may accordingly determine that the machine 100 is in motion or not (e.g., in a moving state or in a stationary state).

Additionally, or alternatively, the machine 100 includes a wheel speed sensor 236 that is associated with the traction devices 112 of the machine 100. The wheel speed sensor 236 may be configured to detect an angular velocity of the traction devices 112 (e.g., either or each of the front wheel 132, the center wheel 134, or the rear wheel 136) and generate signals corresponding to a motion of the machine 100. The controller 204 may be communicably coupled to the wheel speed sensor 236 and may receive signals from the wheel speed sensor 236 pertaining to the angular velocity of either or each of the wheels 132, 134, 136, analyze said signals, and may accordingly determine that the machine 100 is in motion or not, (e.g., in a moving state or in a stationary state).

In some embodiments, therefore, and as noted above, if a speed of the machine 100 is less than the speed threshold (as calculated from either the transmission speed sensor 234 or the wheel speed sensor 236), the controller 204 determines (or detects) a stationary state of the machine 100. As a result, the controller 204 may start/resume transmission of signals from the sensor 202 to the controller 138 (the transmission of signals, from the sensor 202, being suspended when the machine 100 is in a moving state). Similarly, if a speed of the machine 100 exceeds the speed threshold, the controller 204 may terminate transmission of signals, from the sensor 202, because an increase of speed of the machine 100 beyond the speed threshold may indicate that the machine 100 is in a moving state.

Although the transmission speed sensor 234 and the wheel speed sensor 236 have been provided as possible sources through which the controller 204 may determine a moving state of the machine 100, various other alternatives of detecting a moving state of the machine 100 may be contemplated. For example, the machine 100 may analyze a change in Global Positioning System (GPS) coordinates of the machine 100 relative to time to determine a moving state of the machine 100.

Figure 6:
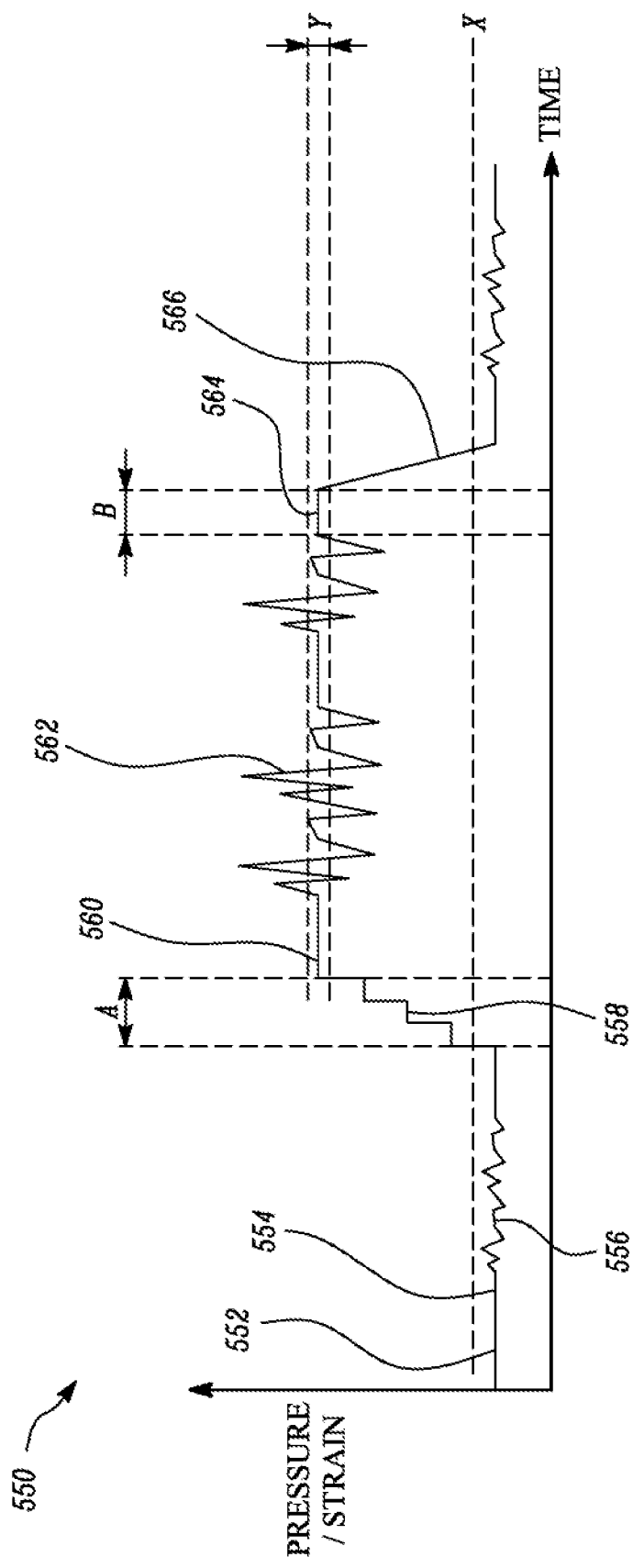
FIG. 6 is a graphical representation illustrating an exemplary method to transmit data used to compute load transported by the machine during the work cycle of the machine, in accordance with an embodiment of the disclosure.

Further, in some embodiments, the controller 204 is configured to start transmission of signals from the sensor 202 to the controller 138 only if a weight indicated by the signals from the sensor 202 exceeds a weight threshold (represented as X, see FIG. 6). Accordingly, when the dump body 118 is empty, there may be no transmission of signals from the sensor 202. Furthermore, during the moving state 190, there may be a dynamic change or variation in the output (or data) provided by the sensor 202. Accordingly, the controller 204 may be configured to terminate the transmission of the signals if the weight of the load, indicated by one or more signals from the sensor 202, is outside of a range, such as a weight variation range (see exemplary weight variation range, Y, shown in FIG. 6 and described in more detail below).

In some embodiments, the controller 204 is configured to cause transmission of signals from the sensor 202 if an angle of tilt of the machine 100 is less than an angle threshold. To this end, the machine 100 (or the load management system 130) includes an inertial measurement unit (IMU) 230 that determines a pitch (or an angle or tilt 'θ') of the machine 100 relative to a vertical axis 232 of the machine 100 (see FIG. 1). The controller 204 may receive signals (indicating a pitch of the machine 100) from the IMU 230. For example, during any stationary state when the machine speed is below the speed threshold, if the IMU 230 detects that an angle of tilt 'θ' of the machine 100 is lesser than the angle threshold (and/or that the machine 100 is on an incline), for example, from the vertical axis 232 (see FIG. 1), the controller 204 may cause the sensor 202 to transmit the signals to the controller 138. In some embodiments, a communication between the IMU 230 and the controller 204 may be wirelessly attained, such as by using any of the above noted communication protocols. However, if the angle of tilt 'θ' of the machine 100 exceeds the angle threshold, the controller 204 may terminate signal transmission. This is because, in a tilted orientation, a signal reading obtained, and thus, a weight of the load estimated for the work cycle 180 may be inaccurate. In this situation notification may be provided to an operator of the machine 100 indicating that the machine 100 is outside of acceptable weighing limits. Moreover, a transmission of the signal from the sensor 202 during such scenarios may also unduly drain the battery 222.

Each of the controller 204 and controller 138 may include power electronics, preprogrammed logic circuits, data processing circuits, associated input/output buses, and be associated with volatile memory units, such as random access memory (RAM), and non-volatile memory units such as read only memory (ROM). In some embodiments, each of the controller 204 and controller 138 may be applied as an application specific integrated circuit, or other logic device. In some embodiments, the functions of the controller 204 may be performed by the controller 138, and accordingly, the controller 204 may be altogether omitted. In some embodiments, it is possible for the controller 138 and controller 204 to be integrated into a single controller.

INDUSTRIAL APPLICABILITY

Figure 5:
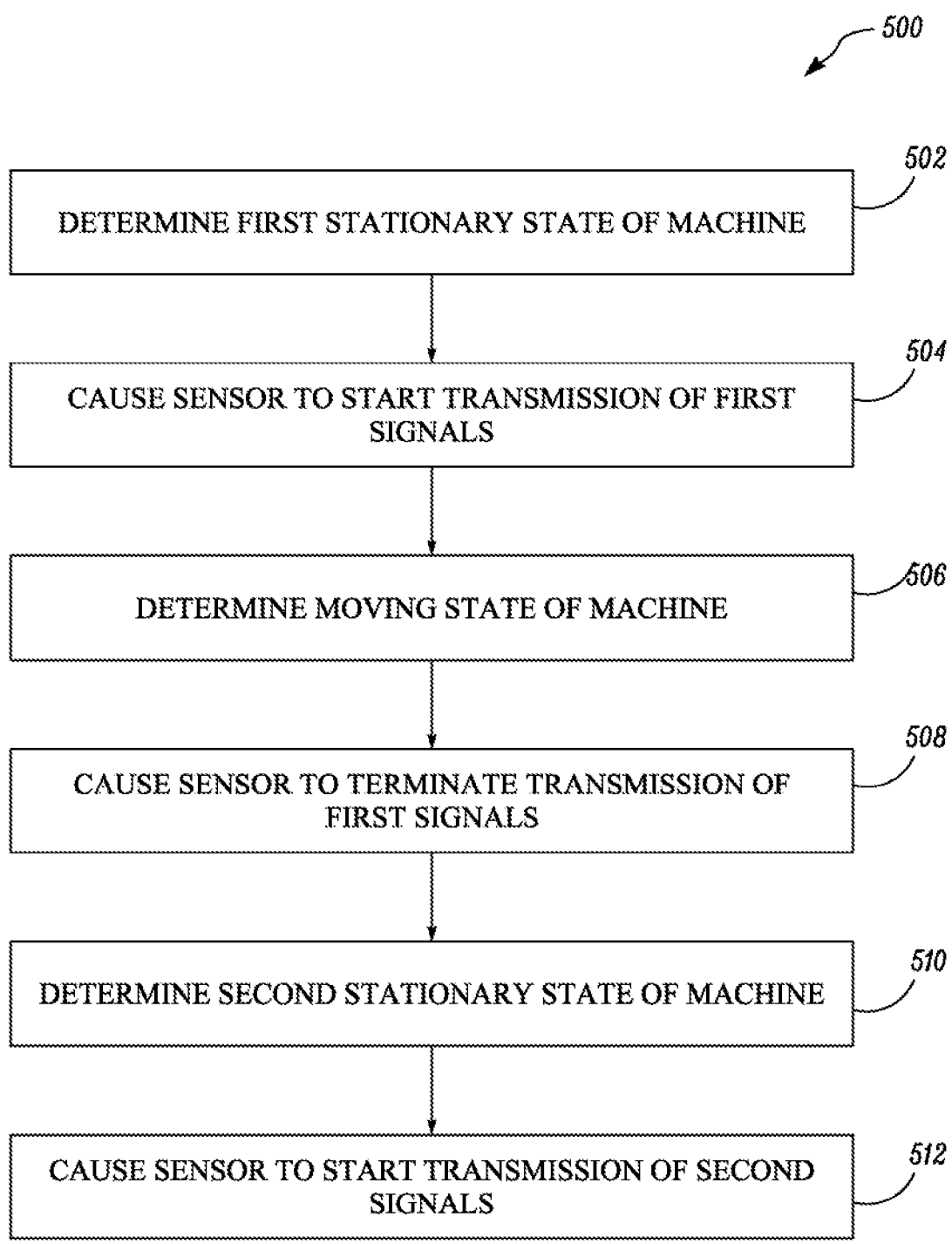
FIG. 5 is an exemplary flowchart depicting an exemplary method for operating the machine, in accordance with an embodiment of the disclosure.

During the work cycle 180, the machine 100 may repeatedly move back-and-forth between the load location 182 and the dump location 184 as part of executing multiple work cycles, such as work cycle 180. With reference to FIG. 5, operational aspects of a single work cycle (i.e., the work cycle 180) is depicted. In particular, an exemplary method for operating the machine 100 during the work cycle 180) is discussed. This method is discussed by way of a flowchart 500, which is described in conjunction with a graphical representation 550 provided in FIG. 6, and in conjunction with each of the FIGS. 1, 2, 3, and 4.

The graphical representation 550 in FIG. 6 includes Time on the X-axis and Strain/Pressure on the Y-axis. A curve 552, which illustrates an exemplary variation of the Strain/Pressure (determined by the sensor 202) relative to time for the work cycle 180, is depicted in said graphical representation 550. Annotations A and B are provided in the graphical representation 550 that respectively indicate a time interval of the first stationary state 192 and the second stationary state 194 of the machine 100, during which the transmission between the sensor 202 and the controller 138 may be active. For ease in understanding, signals provided by the sensor 202 during the first stationary state 192 (i.e., corresponding to the first segment 174 of the work cycle 180) may be referred to as first signals, while signals provided by the sensor 202 during the second stationary state 194 (i.e., corresponding to the third segment 178 of the work cycle 180) may be referred to as second signals. The method initiates at block 502.

At block 502, at the start of the work cycle 180, the machine 100 is stationary to receive a load into the dump body 118. At this point, the controller 204 obtains data pertaining to this state (i.e., a stationary state) of the machine 100. Data pertaining to the stationary state is obtained by the controller 204 as a receipt of a signal from the transmission speed sensor 234 and/or the wheel speed sensor 236, which indicate that the speed of the machine 100 is less than a speed threshold. The controller 204 determines this stationary state as the first stationary state 192 of the machine 100. In the first stationary state 192 the machine 100 receives a load from the load location 182, indicating the start of the work cycle 180. A variation of strain (or pressure) to time corresponding to the first stationary state 192 of the machine 100 is representative of the receipt of load, and is represented by curve portion 558 in FIG. 6.

Notably, before the first stationary state 192, a variation of strain (or pressure) to time corresponding to a stationary state of the machine 100 with no load is represented by curve portion 554 in FIG. 6. Similarly, before the first stationary state 192, a variation of strain (or pressure) to time corresponding to a moving state of the machine 100 with no load is represented by curve portion 556 in FIG. 6. During the moving state and the stationary state, represented by the curve portions 554 and 556, no transmission of the first signals and the second signals is performed since the weight in the dump body 118 during this period is below the weight threshold (represented as X, see FIG. 6). The method proceeds to block 504.

At block 504, upon determining the first stationary state 192 of the machine 100 (i.e., speed below speed threshold) by the controller 204, and as soon as the controller 204 determines that the weight of the load exceeds the weight threshold (represented as X, see FIG. 6), the controller 204 causes the sensor 202 to transmit the first signals (indicative of weight of the load during the first segment 174) to the controller 138. Effectively, the controller 204 may cause a transmission of the first signals only when the dump body 118 is provided with some amount of load. Moreover, the first signals may be transmitted by the sensor 202 during the first segment 174 if the controller 204 determines that the angle of tilt 'θ' of the machine 100 is less than the angle threshold.

In one example, once the machine 100 completes a receipt of the load into the dump body 118, the machine 100 may remain motionless for a 'relatively brief period' according to the third stationary state 196 (i.e., the machine 100 is stationary and loaded). This 'relatively brief period' is the third stationary state 196 of the machine 100. In an example, during the third stationary state 196, the controller 138 may continue to receive signals from the sensor 202 indicating the load within the dump body 118, just as the controller 138 had received signals from the sensor 202 during the first stationary state 192. The load within the dump body 118 during third stationary state 196 is represented by a curve portion 560 on the curve 552. Depending upon a nature of work, environment, productivity targets, etc., the 'relatively brief period' may vary from application to application. It is also possible that in some cases this 'relatively brief period' (i.e., the third stationary state 196) be altogether omitted. The method proceeds to block 506.

At block 506, the machine 100 may start moving. As the machine 100 moves, the transmission speed sensor 234 and/or the wheel speed sensor 236 may provide a signal, indicating the movement of the machine 100 (or the speed of the machine 100), to the controller 204. As soon as the speed of the machine 100 exceeds the speed threshold, the controller 204 determines the moving state 190 of the machine 100, corresponding to the second segment 176 of the work cycle 180. Additionally, or alternatively, the controller 204 determines the moving state of the machine 100 as soon as the weight of the load (e.g., represented as strain (or pressure) in the graphical representation 550 and indicated by the first signals), is outside of the weight variation range, Y. The method proceeds to block 508.

At block 508, based on the determination of the moving state 190 (see FIG. 3) of the machine 100, the controller 204 causes the sensor 202 to terminate a transmission of the first signals. The moving state 190 is represented by curve portion 562. The method proceeds to block 510.

At block 510, the machine 100 reaches the dump location 184. After reaching the dump location 184, at least one of the wheel speed sensor 236 or the transmission speed sensor 234 may provide a signal, indicating that a speed of the machine 100 is less than a speed threshold, to the controller 204. Additionally, or alternatively, signals from the sensor 202 may vary and return within the weight variation range, Y, thus indicating the reduced speed of the machine 100. As soon as the speed of the machine 100 recedes below the speed threshold and/or the signals from the sensor 202 moves within the weight variation range, Y, the controller 204 determines the second stationary state 194, corresponding to the third segment 178 of the work cycle 180, of the machine 100. In some embodiments, during the third segment 178, the controller 204 may also determine whether the weight of the load exceeds the weight threshold (represented as X, see FIG. 6) to cause the transmission of the second signals. In the second stationary state 194, the machine 100 may be stationary prior to dumping the load at a dump location 184. Similar to the 'relatively brief period' discussed above, the machine 100 may remain stationary for 'another relatively brief period' during the second stationary state 194 (i.e., the machine 100 is stationary and loaded) prior to the dumping of the load. This period is represented by the curve portion 564. The method proceeds to block 512.

At block 512, upon the determination of the second stationary state 194 of the machine 100, (and, for example, as soon as the controller 204 may detect the speed of the machine 100 to have receded below the speed threshold) the controller 204 causes the sensor 202 to start transmission of second signals (indicative of weight of the load during the third segment 178) to the controller 138. The second signals may be transmitted for the whole of the second stationary state 194 of the machine 100 since the weight indicated by second signals during the second stationary state 194 may exceed the weight threshold (represented as X, see FIG. 6). Moreover, the second signals may be transmitted by the sensor 202 during the third segment 178 if the controller 204 determines the angle of tilt 'θ' of the machine 100 to be less than the angle threshold. After the second stationary state 194, the machine 100 may facilitate a dumping of the load at the dump location 184, for example, by raising of the dump body 118 so that the load may freely flow out under the action of gravity to the dump location 184. The state of the machine 100 during the dumping operation is determined as the fourth stationary state 198 by the controller 204. As soon as a weight of the load indicated by the second signals starts decreasing at a rate in excess of a predefined rate during the fourth stationary state 198, or as soon as the weight of the load (represented as strain or pressure in the graphical representation 550) falls below the weight threshold (represented as X, see FIG. 6) during the fourth stationary state 198, the controller 204 causes the sensor 202 to terminate the transmission of the second signals.

In some embodiments, the fourth stationary state 198 may be determined by detecting the raising of the dump body 118, or by detecting the decreasing weight of the load in the dump body 118. The fourth stationary state 198 is represented by curve portion 566. Dumping of load at the dump location 184 indicates an end of the work cycle 180.

In some embodiments, the signals may be used for data analytics relating to an efficiency of the work cycle 180, a productivity of an operator of the machine 100, conditions of the roads associated with the work cycle 180, and/or the like. For example, the controller 204 may be configured to determine a difference between the weight of the load during the first segment 174 and the weight of the load during the third segment 178, and determine one or more of a road condition associated with the work cycle 180, the efficiency of the work cycle 180, or the productivity of an operator of the machine 100, based on the difference in weight. A larger difference between the weights (e.g., beyond a weight difference threshold), may indicate a lower efficiency, poorer productivity, and poorer road condition. Further, as an example, the load management system 130 may be installed in more than one machine at the worksite 102, and thus the data analytics may be performed for each such machine to determine a productivity and efficiency corresponding each such machine. Moreover, it may be possible to ascertain whether an operator of one machine is operating differently from operators of other machines, and whether any operator needs to enhance their skills and/or may need to undergo any additional training to enhance productivity.

Furthermore, transmitting the signal only during specific instances of the work cycle 180 (i.e., during the first stationary state 192, the second stationary state 194, and possibly during the third stationary state 196) means that the battery 222 is kept from usage during the other states of the machine 100 (such as during the moving state 190 of the machine 100), thereby lessening battery usage, mitigating battery drain, and prolonging battery life.

In an example scenario, a transmission of the signal from the sensor 202 to the controller 138 may be performed at a sufficiently slow rate (such as at a frequency of 5-10 Hertz) for a first stationary state that lasts 30 seconds. In another example, however, a frequency of signal transmission may be increased during a second stationary state that lasts for a shorter period than the first stationary state. Such rate of signal transmission may ensure an efficient delivery of strain (or pressure) data to the controller 204, and by which a sufficiently accurate weight of the load transported during the work cycle 180 may be derived. More particularly, the battery 222 is saved from excessive use and drain since the sensor 202 is refrained from transmitting excessive strain (or pressure) data because of the slow rate of transmission. In an example, excessive strain (or pressure) data transmission may refer to a transport frequency of above 20 Hertz to the controller 138.

In some embodiments, the work cycle 180 may include and/or require additional machine stoppages, and at each such stoppage, the controller 204, detecting the machine speed to have fallen below the speed threshold, may cause the sensor 202 to start transmission of the signals (such as third signals) indicating a weight of the load to the controller 138. Thus, sensor outputs may be delivered to the controller 138 whenever the machine 100 is stationary to improve the accuracy of the measured load in the dump body 118. In some embodiments, data from the sensor 202, may be wirelessly transmitted to devices other than the controller 138. For example, strain (or pressure) data from the sensor 202 may be transmitted to a back office, one or more remote workstations, a device (such as a smartphone) associated with the operator, etc. In some embodiments, the devices may use the data for data analytics in a manner similar to the data analytics described above.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof. No element/component, act/action performed by any element/component, or instruction used herein should be construed as critical or essential unless explicitly described as such. Additionally, the phrase "based on" is intended to mean "based, at least in part, on" unless explicitly stated otherwise. Furthermore, the articles "a" and "an," as used herein, are intended to include one or more items, and may be used interchangeably with "one or more". In the event only one item is intended, the term "one" or similar language is used. Moreover, the terms "has," "have." "having." or the like, as also used herein, are intended to be open-ended terms.

What is claimed is:

1. A method for operating a machine adapted to transport a load during a work cycle, the method comprising:
   determining that the machine is in a first stationary state, the first stationary state corresponding to a first segment of the work cycle;
   causing one or more sensors to start transmission of one or more first signals based on determining that the machine is in the first stationary state, the one or more first signals indicating a weight of the load during the first segment;
   determining that the machine is in a moving state, the moving state corresponding to a second segment of the work cycle;
   causing the one or more sensors to terminate the transmission of the one or more first signals based on determining that the machine is the moving state;
   determining that the machine is in a second stationary state, the second stationary state corresponding to a third segment of the work cycle; and
   causing the one or more sensors to start transmission of one or more second signals based on determining that the machine is in the second stationary state, the one or more second signals indicating the weight of the load during the third segment.

2. The method of claim 1, further comprising:
   determining whether the weight, of the load during the first segment, exceeds a weight threshold;
   transmitting the one or more first signals when the weight, of the load during the first segment, exceeds the weight threshold;
   determining whether the weight, of the load during the third segment, exceeds the weight threshold; and
   transmitting the one or more second signals when the weight, of the load during the third segment, exceeds the weight threshold.

3. The method of claim 1, further comprising:
   determining whether an angle of tilt, of the machine during the first segment, is less than an angle threshold;
   transmitting the one or more first signals when the angle of tilt, of the machine during the first segment, is less than the angle threshold;
   determining whether the angle of tilt, of the machine during the third segment, is less than the angle threshold; and
   transmitting the one or more second signals when the angle of tilt, of the machine during the third segment, is less than the angle threshold.

4. The method of claim 1,
   wherein determining that the machine is in the first stationary state includes determining that a speed of the machine is less than a speed threshold, and
   wherein determining that the machine is in the second stationary state includes determining that the speed of the machine is less than the speed threshold.

5. The method of claim 1, further comprising:
   determining whether the weight, of the load indicated by the one or more first signals, is outside of a range; and
   terminating transmission of the one or more first signals when the weight, of the load indicated by the one or more first signals, is outside of the range.

6. The method of claim 1, wherein
   the first segment is a loading segment corresponding to a receipt of the load into the machine at a load location indicating a start of the work cycle,
   the second segment is a hauling segment corresponding to a hauling of the load from the load location to a dump location; and
   the third segment is a dumping segment corresponding to a dumping of the load at the dump location indicating an end of the work cycle.

7. The method of claim 1, wherein the one or more sensors include a wireless sensor.

8. A load management system for a machine, the load management system comprising:
   one or more sensors configured to detect a weight of a load received into the machine; and
   a controller communicably coupled with the one or more sensors, the controller configured to:
      determine that the machine is in a first stationary state, the first stationary state corresponding to a first segment of a work cycle of the machine;
      cause the one or more sensors to start transmission of one or more first signals based on determining that the machine is in the first stationary state, the one or more first signals indicating the weight of the load during the first segment;
      determine that the machine is in a moving state, the moving state corresponding to a second segment of the work cycle;
      cause the one or more sensors to terminate the transmission of the one or more first signals based on determining that the machine is the moving state;
      determine that the machine is in a second stationary state, the second stationary state corresponding to a third segment of the work cycle; and
      cause the one or more sensors to start transmission of one or more second signals based on determining that the machine is in the second stationary state, the one or more second signals indicating the weight of the load during the third segment.

9. The load management system of claim 8, wherein the controller is configured to:
   determine whether the weight, of the load during the first segment, exceeds a weight threshold;

transmit the one or more first signals when the weight, of the load during the first segment, exceeds the weight threshold;
determine whether the weight, of the load during the third segment, exceeds the weight threshold; and
transmit the one or more second signals when the weight, of the load during the third segment, exceeds the weight threshold.

10. The load management system of claim 8, wherein the controller is configured to:
determine whether an angle of tilt, of the machine during the first segment, is less than an angle threshold;
transmit the one or more first signals when the angle of tilt, of the machine during the first segment, is less than the angle threshold;
determine whether the angle of tilt, of the machine during the third segment, is less than the angle threshold; and
transmit the one or more second signals when the angle of tilt, of the machine during the third segment, is less than the angle threshold.

11. The load management system of claim 8,
wherein determining that the machine is in the first stationary state includes determining that a speed of the machine is less than a speed threshold, and
wherein determining that the machine is in the second stationary state includes determining that the speed of the machine is less than the speed threshold.

12. The load management system of claim 8, wherein the controller is configured to:
determine a difference between the weight of the load during the first segment and the weight of the load during the third segment; and
determine one or more of a road condition associated with the work cycle, an efficiency of the work cycle, or a productivity of an operator of the machine, based on the difference.

13. The load management system of claim 8, wherein the controller is configured to:
determine whether the weight, of the load indicated by the one or more first signals, is outside of a range; and
terminate transmission of the one or more first signals when the weight, of the load indicated by the one or more first signals, is outside of the range.

14. The load management system of claim 8, wherein the one or more sensors include a wireless sensor.

15. A machine, comprising:
a dump body configured to receive a load;
a beam to support a weight of the load received into the dump body;
one or more sensors coupled to the beam and configured to detect the weight of the load; and
a controller communicably coupled with the one or more sensors, the controller configured to:
determine that the machine is in a first stationary state, the first stationary state corresponding to a first segment of a work cycle of the machine;
cause the one or more sensors to start transmission of one or more first signals based on determining that the machine is in the first stationary state, the one or more first signals indicating the weight of the load during the first segment;
determine that the machine is in a moving state, the moving state corresponding to a second segment of the work cycle;
cause the one or more sensors to terminate the transmission of the one or more first signals based on determining that the machine is the moving state;
determine that the machine is in a second stationary state, the second stationary state corresponding to a third segment of the work cycle; and
cause the one or more sensors to start transmission of one or more second signals based on determining that the machine is in the second stationary state, the one or more second signals indicating the weight of the load during the third segment.

16. The machine of claim 15, wherein the controller is configured to:
determine whether the weight, of the load during the first segment, exceeds a weight threshold;
transmit the one or more first signals when the weight, of the load during the first segment, exceeds the weight threshold;
determine whether the weight, of the load during the third segment, exceeds the weight threshold; and
transmit the one or more second signals when the weight, of the load during the third segment, exceeds the weight threshold.

17. The machine of claim 15, wherein the controller is configured to:
determine whether an angle of tilt, of the machine during the first segment, is less than an angle threshold;
transmit the one or more first signals when the angle of tilt, of the machine during the first segment, is less than the angle threshold;
determine whether the angle of tilt, of the machine during the third segment, is less than the angle threshold; and
transmit the one or more second signals when the angle of tilt, of the machine during the third segment, is less than the angle threshold.

18. The machine of claim 15,
wherein determining that the machine is in the first stationary state includes determining that a speed of the machine is less than a speed threshold, and
wherein determining that the machine is in the second stationary state includes determining that the speed of the machine is less than the speed threshold.

19. The machine of claim 15, wherein the controller is configured to:
determine a difference between the weight of the load during the first segment and the weight of the load during the third segment; and
determine one or more of a road condition associated with the work cycle, an efficiency of the work cycle, or a productivity of an operator of the machine, based on the difference.

20. The machine of claim 15, wherein the controller is configured to:
determine whether the weight, of the load indicated by the one or more first signals, is outside of a range; and
terminate transmission of the one or more first signals when the weight, of the load indicated by the one or more first signals, is outside of the range.

* * * * *